US009669430B2

(12) United States Patent
Tresse et al.

(10) Patent No.: US 9,669,430 B2
(45) Date of Patent: Jun. 6, 2017

(54) METHOD OF SORTING SMALL FLOWS OF MAIL

(71) Applicant: Solystic, Bagneux (FR)

(72) Inventors: Didier Tresse, Saint Laurent D'Olnay (FR); Karim Kara, Chabeul (FR); David Morisot, Beaumont les Valence (FR)

(73) Assignee: SOLYSTIC, Gentilly (FR)

(*) Notice: Subject to any disclaimer, the term of this patent is extended or adjusted under 35 U.S.C. 154(b) by 0 days.

(21) Appl. No.: 14/432,566

(22) PCT Filed: Jan. 14, 2015

(86) PCT No.: PCT/FR2015/050087
§ 371 (c)(1),
(2) Date: Mar. 31, 2015

(87) PCT Pub. No.: WO2015/121554
PCT Pub. Date: Aug. 20, 2015

(65) Prior Publication Data

US 2016/0339480 A1 Nov. 24, 2016

(30) Foreign Application Priority Data

Feb. 17, 2014 (FR) ..................................... 14 51231

(51) Int. Cl.
*G06F 7/00* (2006.01)
*B07C 3/00* (2006.01)

(52) U.S. Cl.
CPC ................ *B07C 3/006* (2013.01); *B07C 3/00* (2013.01)

(58) Field of Classification Search
USPC .......................................................... 700/224
See application file for complete search history.

(56) References Cited

U.S. PATENT DOCUMENTS 5,901,855 A * 5/1999 Uno .......................... B07C 3/02 209/584
6,227,378 B1 * 5/2001 Jones ........................ B07C 3/04 198/703
(Continued)

FOREIGN PATENT DOCUMENTS

DE 102005055763 B3 4/2007
EP 225049 9/1987
(Continued)

OTHER PUBLICATIONS

French Search Report dated Oct. 2, 2014 for Application No. 14 51231.

*Primary Examiner* — Kyle Logan
(74) *Attorney, Agent, or Firm* — Patterson & Sheridan LLP

(57) ABSTRACT

A method of sorting mailpieces by using a dynamic assignment process and an overbooking mechanism whereby an overbooked sorting destination (D) is substituted for a sorting destination that is already assigned to a certain sorting outlet (S) comprises the following steps: a) identifying from among said sorting outlets (S) a sorting outlet that has a filling level (N) greater than a first threshold (s1) and the longest idle time, and assigning the overbooked sorting destination to that sorting outlet; b) if all of the sorting outlets (S) have filling levels (N) less than said first threshold (s1), identifying from among the sorting outlets the sorting outlet that has the longest idle time, assigning that sorting outlet to said overbooked sorting destination, and indicating that said other sorting destination is a sorting destination to be amalgamated.

7 Claims, 2 Drawing Sheets

(56) References Cited

U.S. PATENT DOCUMENTS

| | | | | |
|---|---|---|---|---|
| 6,283,304 | B1 * | 9/2001 | Gottlieb | B07C 3/00 209/603 |
| 8,005,569 | B2 * | 8/2011 | Kechel | B07C 3/06 198/358 |
| 8,271,127 | B2 * | 9/2012 | Cartal | B07C 3/00 209/584 |
| 8,504,192 | B2 * | 8/2013 | Faivre | B07C 3/00 209/583 |
| 2005/0056573 | A1 * | 3/2005 | Berdelle-Hilge | B07C 1/00 209/584 |
| 2006/0070929 | A1 * | 4/2006 | Fry | B07C 3/00 209/583 |
| 2006/0113223 | A1 * | 6/2006 | Quine | B07C 3/00 209/584 |
| 2007/0007946 | A1 * | 1/2007 | Uekert | B07C 5/344 324/759.03 |
| 2007/0272601 | A1 * | 11/2007 | Cormack | B07C 3/06 209/584 |

FOREIGN PATENT DOCUMENTS

| | | | |
|---|---|---|---|
| EP | 1084770 | A1 | 3/2001 |
| WO | 2009/081008 | A2 | 7/2009 |
| WO | 2010130920 | A1 | 11/2010 |

* cited by examiner

METHOD OF SORTING SMALL FLOWS OF MAIL

TECHNICAL FIELD

The invention relates to the field of postal sorting.

The invention relates more particularly to a method of sorting mailpieces into M sorting destinations in a postal sorting machine having N sorting outlets, where M>N, by using, in the postal sorting machine, a dynamic assignment process for dynamically assigning the sorting outlets to the sorting destinations, and whereby, if a sorting destination of an incoming mailpiece is overbooked, said overbooked sorting destination is substituted for another sorting destination that is already assigned to a certain sorting outlet of the machine so as to store the current mailpiece in said certain sorting outlet.

Dynamic assignment or allocation is a process that consists in assigning or allocating a sorting outlet of the sorting machine to a sorting destination as a mailpiece passes through the sorting machine after automatically recognizing the address on said mailpiece.

Therefore, in the machine, there is a dynamic sort plan with sorting destinations that are dynamically put into correspondence with the sorting outlets of the sorting machine.

The overbooking mechanism in a dynamic assignment process for dynamically assigning the sorting outlets of a sorting machine makes it possible to operate a sorting machine that has fewer sorting outlets than there are sorting destinations, and consists in using as a sorting outlet for sorting a current mailpiece corresponding to a certain sorting destination in the sort plan a sorting outlet that is already assigned to another sorting destination. As a result, the mailpieces already sorted in said sorting outlet must then be removed from said sorting outlet to leave space for the current mailpiece and for the subsequent other mailpieces having the same sorting destination as the current mailpiece.

The mailpieces removed from the sorting outlet can be transported from the sorting machine in storage trays.

PRIOR ART

Overbooking mechanisms in dynamic allocation processes for dynamically allocating sorting outlets in postal sorting machines are described in Patent Documents EP 2 225 049, DE 10 2005 055 763, and U.S. Pat. No. 8,005,569.

In those known dynamic allocation processes with overbooking mechanisms, the small flows of mail (i.e. the batches of mail that are of small volumes and that have sorting destinations that are of low density) are processed in the same way as large flows of mail (batches of mail that are of large volumes) for which the sorting destinations are distributed almost uniformly in the sorting outlets of the sorting machine.

In a national outward sorting center in which the mail is sorted by post code, e.g. for grouping the mail together by city or by large "conurbation" or "agglomeration", the volume of mail fluctuates depending on the various post codes during the day or during the days of the week, and also during specific periods of the year, e.g. public holidays.

As a result, depending on the nature of the flows of mail to be sorted, some machine sorting outlets can contain very little mail, or indeed a large number of sorting outlets can be contain very little mail.

Such fluctuations can occur during a sorting day during which several tens of flows of mail are machine sorted.

It can be understood that the sorting outlets of the sorting machine can remain nearly empty for some sorting destinations when sorting small flows of mail.

With the overbooking mechanism, the nearly-empty sorting outlets can have their trays changed, but the small contents of those sorting outlets that are then removed from the sorting machine, e.g. in storage trays which themselves therefore remain nearly empty, affects mail transport costs non-negligibly when, for example, such nearly-empty trays are then transported by trucks, ships, or other means of transport.

An object of the invention is to remedy those drawbacks and, in particular, to minimize the impact of small flows of mail in this type of process.

SUMMARY OF THE INVENTION

The basic idea of the invention is to identify the small flows of mail dynamically during a sorting pass to which said mail is subjected, and to cause the mailpieces that have low filling density to be amalgamated or grouped together, and to re-process them at the end of the sorting process during a new automatic sorting process.

It is thus possible to avoid having to transport storage trays of mail that are nearly empty because of such small flows of mail.

More particularly, the invention provides a method of sorting mailpieces into M sorting destinations in a postal sorting machine having N sorting outlets, where M>N, by using, in the sorting machine, a dynamic assignment process for dynamically assigning the sorting outlets to the sorting destinations, and whereby, if a sorting destination of an incoming mailpiece is overbooked, said overbooked sorting destination is substituted for another sorting destination that is already assigned to a certain sorting outlet of the machine so as to store the current mailpiece in said certain sorting outlet, said method being characterized in that it comprises, inter alia, the following steps:

a) identifying from among said sorting outlets first sorting outlets that have filling levels greater than a first threshold, and then identifying from among said first sorting outlets that first sorting outlet that has the longest idle time, and assigning said first sorting outlet that has the longest idle time to said overbooked sorting destination; and b) if all of the sorting outlets have filling levels less than said first threshold, identifying from among said sorting outlets a second sorting outlet that has the longest idle time, and then assigning that sorting outlet to said overbooked sorting destination, and indicating that said other sorting destination is a sorting destination to be amalgamated.

The method of the invention may have the following features:

- if it is determined that a current mailpiece to be sorted has a sorting destination indicated in the machine as being a sorting destination to be amalgamated, said current mailpiece is sorted into a sorting outlet of the machine that is assigned to amalgamation.

It may further comprise the following steps:

- if said second sorting outlet has a filling level greater than a second threshold that is less than the first threshold, removing from the sorting machine the mailpieces that are stored in said second sorting outlet; and
- if said second sorting outlet has a filling level less than said second threshold, recycling into the inlet of the sorting machine said mailpieces stored in said second sorting outlet.

It may further comprise the following steps:

at the end of a first sorting pass of the mailpieces through the sorting machine, recycling into the inlet of the sorting machine the mailpieces that are stored in said sorting outlet assigned to amalgamation; and performing a second machine sorting pass with said recycled mailpieces for sorting them again into the sorting outlets of the sorting machine.

The first threshold may lie in the range 70% to 80% and the second threshold may lie in the range 45% to 55%.

The method of the invention may apply to different types of mailpieces, such as letters, large-format flat articles or "flats", mail that is wrapped in plastics or paper wrappers, or indeed mixed mail, this list not being limiting.

The method of the invention applies preferably to single-pass outward sorting of mail in outward sorting centers.

The method of the invention is also applicable for successively sorting a first flow of mail and a second flow of mail in a sorting machine without having to empty the sorting outlets of the sorting machine fully after sorting the first flow of mail.

For this purpose, two sort plans for respective ones of the two flows of mail are merged or grouped together into a single sort plan. It is then possible to have a number of sorting destinations that is considerably greater than the number of sorting outlets of the machine, approximately in the range 40% more sorting destinations to 50% more sorting destinations relative to the number of sorting outlets of the sorting machine.

In the sorting outlets of the sorting machine, the mailpieces of the second flow of mail progressively replace the mailpieces of the first flow of mail due to the overbooking mechanism, but, overall, the processing time for processing the mail is reduced relative to when the flows of mail are sorted separately.

DESCRIPTION OF IMPLEMENTATIONS

Figure 1:
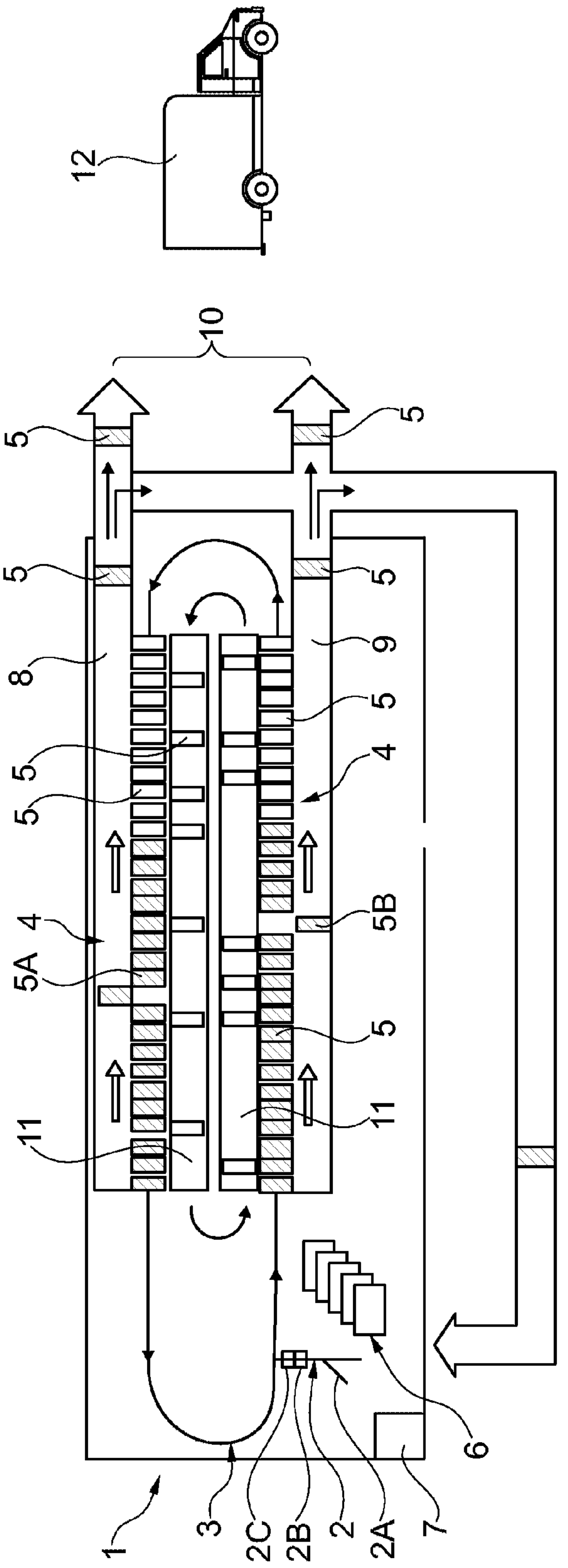
FIG. 1 is a highly diagrammatic view of a postal sorting installation for implementing the method of the invention.

FIG. 1 is a highly diagrammatic view of a postal sorting installation including a postal sorting machine 1 suitable for implementing the method of the invention.

By way of example and as shown, the postal sorting machine 1 has an inlet 2 for receiving mailpieces to be sorted, which inlet feeds a bin carrousel 3, the bins of the carrousel not being shown in FIG. 1.

Each of the bins of the carrousel normally transports one mailpiece at a time and circulates around a loop above a set of physical sorting outlets 4 of the machine. In this example, the sorting outlets are disposed in line on opposite sides of the machine.

In the example, each sorting outlet 4 is provided with a removable storage tray 5. More particularly, the mailpiece that is transported in a bin 3 of the carrousel comes to fall under gravity into the storage tray 5 of the sorting outlet 4 that is assigned or allocated to the sorting destination corresponding to said mailpiece.

FIG. 1 shows a flow of mailpieces 6 disposed in a stack and on edge in a feed magazine of an unstacker 2A placed at the feed inlet 2 of the sorting machine.

As is well known, the stacked mailpieces 6 are put into series by the unstacker 2A, which, for example, may be of the type having a perforated belt and suction nozzles.

Downstream from the unstacker 2A, an image acquisition unit 2B forms an image of the address block of each mailpiece, and, by using Optical Character Recognition (OCR), the address is recognized automatically in the image by the data processor unit 7 that controls the equipment of the sorting machine.

Then, on the basis of the address recognized for a current mailpiece, the data processor unit 7 determines a sorting destination in a sort plan that associates a sorting destination (sort code) with a physical sorting outlet of the sorting machine.

For example, a sorting destination may correspond to a post code. Mail items having the same post code in their delivery address blocks can thus be sorted into the same sorting outlet of the machine.

In addition, means 2C are provided for measuring the thickness of each mailpiece put in a series so that the unit 7 can act for each sorting outlet and as the mailpieces are stored, to estimate a filling level to which said outlet is filled with mailpieces by accumulating thicknesses as sorting progresses.

Reference is made below to a relative storage level or to a filling percentage lying in the range 0% to 100%. The thickness of each mailpiece may be measured by sensors or by imaging as is well known to the person skilled in the art.

The unit 7 is also arranged to record, in correspondence with each sorting outlet, a time that corresponds to the time at which the mailpiece most recently stored in the sorting outlet was stored. Said time is an indication of idle time, i.e. of how long ago the sorting outlet was last active. Said time may correspond to the time at which the unit 7 determines a mailpiece is unloaded into the sorting outlet in question. Said time may be given by an internal clock of the unit 7.

FIG. 1 also shows conveyors 8, 9 of full trays 5 (each of the full trays are represented by a cross-hatched rectangle), which conveyors run past the fronts of the sorting outlets 4 of the machine and are extended either towards an outlet 10 for removing full trays, or towards a feed inlet 2 of the machine for recycling the mailpieces that they contain.

FIG. 1 also shows a conveyor 11 of empty trays 5 (each of the empty trays is represented by a non-hatched rectangle) that causes empty trays to travel past the backs of the sorting outlets 4 and that is adapted to reload each sorting outlet 4 with an empty tray.

In the context of implementing the method of the invention, the number M of sorting destinations in the sort plan is greater than the number N of physical sorting outlets of the sorting machine 1 and thus allocation of a physical sorting outlet 4 to a sorting destination for a mailpiece 6 to be sorted takes place dynamically in the unit 7 at the time at which said mailpiece 6 passes through the machine, and a mechanism is provided for changing the tray of a sorting outlet for an empty tray when an overbooking situation arises as is well known to the person skilled in the art.

Thus, in the machine, there is a dynamic sort plan with dynamic assignments (shown by arrows A) between the logical sorting destinations $D_1 \ldots DL \ldots D_N$ and the physical outlets $S_1 \ldots S_M$.

FIG. 1 shows full trays 5A and 5B being replaced with empty trays in the sorting outlets so as to illustrate the behavior of the sorting machine in overbooking situations.

The principle of the overbooking mechanism thus consists in forcing the sorting outlet to be emptied (forcing the storage tray already containing mailpieces corresponding to a certain sorting destination to be removed) and forcing it to be replaced with an empty tray for receiving new mailpieces corresponding to another sorting destination.

The method of the invention lies more particularly in specifically selecting the sorting outlet in which the trays are exchanged in such a manner as to minimize the wasted volumes, i.e. the wastage generated by overly systematic removal of trays that are filled to only a very small extent with mailpieces.

In a conventional overbooking mechanism, preference is given to the sorting outlet having the storage tray that is filled to the greatest extent in such a manner as to minimize the wasted volume during transport of the trays, but trials have shown that such a selection criterion has its limits whenever the ratio M/N is greater than 1.06. The method of the invention makes it possible to exceed that ratio without additional wastage of volume.

Figure 2:
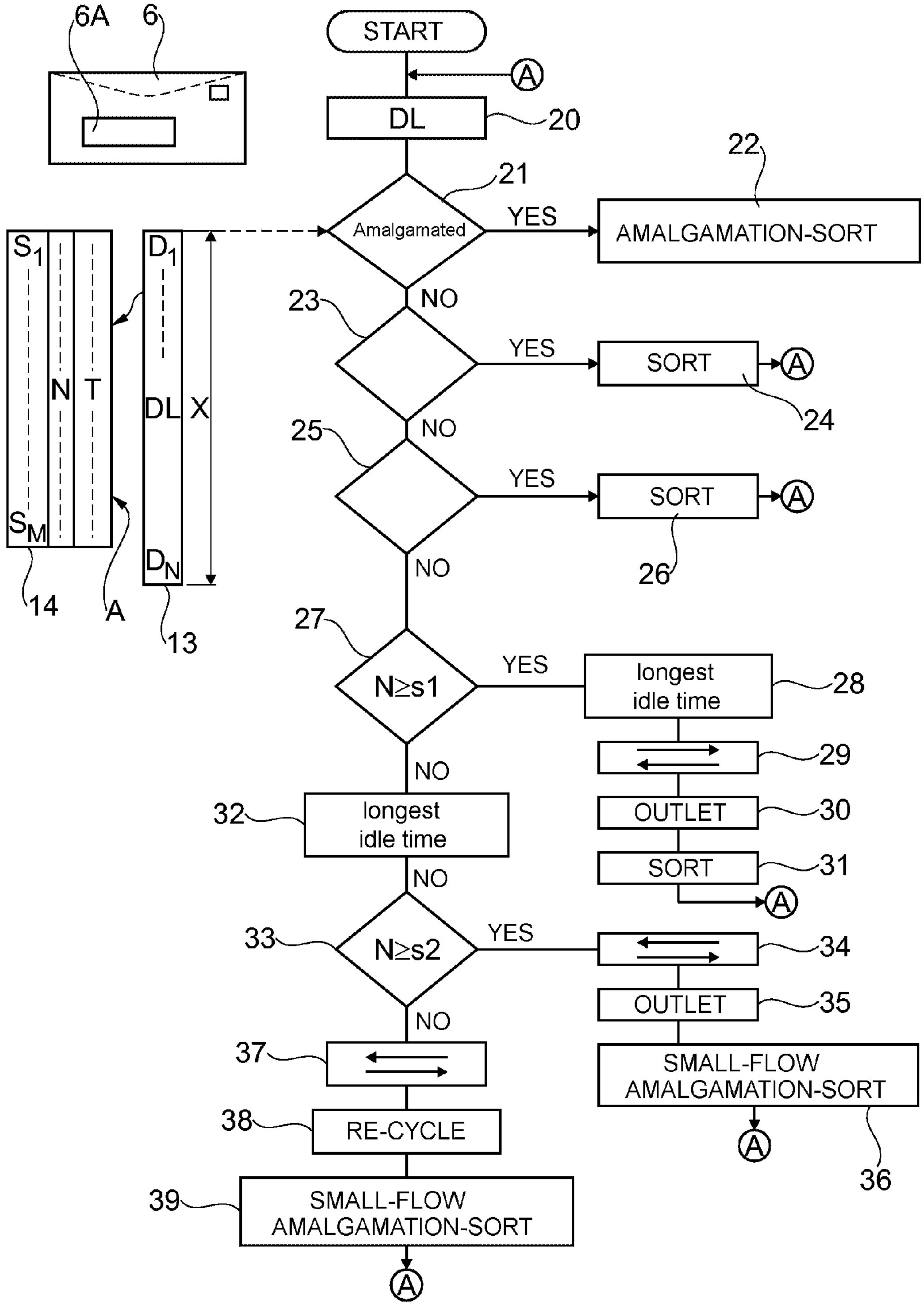
FIG. 2 shows the steps of the method of the invention in the form of a block diagram.

FIG. 2 shows the method of the invention, in which method the selection criterion for selecting the sorting outlet for exchanging trays in the event of overbooking combines taking account both of a tray filling criterion and of a criterion of longest idle time for which the tray has remained idle.

The method of the invention is substantially data processing that is implemented in the unit 7.

It is thus easy to use in existing sorting installations, in particular in outward sorting centers in which the mail is sorted in a single sorting pass so as then to be taken to inward sorting centers by truck, aircraft, train, or the like.

In FIG. 2, in step 20, for a current mailpiece 6, the postal address in the delivery address block 6A has been recognized on the basis of OCR in the image of said mailpiece, which image is delivered by the unit 2B.

On the basis of said recognized postal address, the unit 7 determines the sorting destination that corresponds to it in the dynamic sort plan loaded in the unit 7.

Said sorting destination DL constitutes a group destination for sorting the mailpieces. For example, the sorting destination DL may be a post code or a portion of a post code.

In step 21, the sorting process in the unit 7 determines whether or not said sorting destination DL for the current mailpiece is an amalgamated sorting destination, i.e. a destination that is already recognized by the unit 7 during the sorting process as being part of a small flow of mail.

As described below, the mailpieces stored in a sorting outlet assigned to an amalgamated sorting destination are grouped together at the inlet of the sorting machine for a new sorting pass for sorting into the sorting outlets of the sorting machine.

The unit 7 may, for example, store in a memory a table 13 of all of the sorting destinations of the current machine sort plan so that it can record an amalgamation indication in association with each sorting destination. This indication may be binary data of the 1/0 type, and, in FIG. 2, by way of example, an X symbolizing such binary data is shown facing the sorting destination DL.

When, in step 21, the sorting destination is an amalgamated sorting destination, the process continues at 22 by sorting the current mailpiece into the sorting outlet that is allocated dynamically by the unit 7 to the amalgamated sorting destinations.

It should be understood that, in this sorting process, a specific sorting outlet of the machine may be allocated dynamically to one or more amalgamated sorting destinations.

The mailpieces that are stored in this amalgamated sorting outlet are recycled into the inlet of the machine for another sorting process as indicated above following a corresponding sort plan. The sort plan may also be a dynamic sort plan.

When the result of step 21 is "no", the process continues at step 23.

In step 23, the unit 7 performs a search to determine whether a sorting outlet S is already allocated for the sorting destination DL of the current mailpiece.

For example, the indication that a sorting outlet S is already allocated to the sorting destination DL may be obtained by the unit 7 through exploring a second table 14 recorded in the memory and that, at each instant, establishes the dynamic correspondence of each sorting outlet of the machine $S_1 \ldots S_M$ with the sorting destinations $D_1 \ldots D_M$. In addition, for the needs of the method of the invention, an indication of filling level N and an indication of longest idle time T are put into correspondence with each sorting outlet S.

These indications N and T are initialized each time an empty tray is loaded into the sorting outlet in question.

When the result of step 23 is "yes", the process continues at step 24 by sorting the current mailpiece into the sorting outlet S identified by the unit 7.

When the result of step 23 is "no", the process continues at step 25.

In step 25, the unit 7 performs a search to determine whether a sorting outlet S of the sorting machine that is not yet allocated is available for the sorting destination DL. In this sorting outlet that is not yet allocated, the storage tray 5 is thus empty.

When the result of step 25 is "yes", the process continues at step 26 by allocating said available sorting outlet to the sorting destination DL and the unit 7 causes the current mailpiece to be sorted into said available sorting outlet.

In step 26, the unit 7 records, at the same time, the assignment A between said available sorting outlet and the sorting destination DL. The indications N and T in table 14 are also updated in correspondence with said available sorting outlet.

When the result of step 25 is "no", the process continues at step 27.

In step 27, the unit 7 explores the table 14, in this example, to identify, from among all of the sorting outlets of the machine, those sorting outlets that have a filling level N greater than a first threshold s1.

The first threshold may lie in the range 70% to 80%, e.g. 75%. The threshold value s1 may be made adjustable so as to take account of the specificities of the flows of mail to be sorted.

When one or more sorting outlets S are identified in step 27 by the unit 7, the unit 7 then, in step 28, searches, from among those sorting outlets, for that one that has the longest idle time, in this example by scanning the table 14, i.e. the one that has the time T for most recent storage activity that is the longest ago.

The process then continues at step 29 with a change of trays in said sorting outlet that has the longest idle time.

At the same time, the sorting destination DL is substituted in the dynamic sort plan for the destination that was previously allocated to said sorting outlet having the longest idle time.

The indications N and T in correspondence with said sorting outlet are initialized in table 14.

The tray that is extracted from said sorting outlet is thus filled to more than 75% with mailpieces. It is brought by the full-tray conveyor 8 or 9 in FIG. 1 and is then taken towards an outlet 10 for removing full trays from the machine so as to be removed by truck or the like.

An empty tray 5 is brought by the empty-tray conveyor 11 into said sorting outlet.

At the same time, in step 31, the current mailpiece is sorted into said sorting outlet and the indications N and T in table 14 are updated with the parameters applicable to the current mailpiece.

It can be understood that steps 27 to 31 concern processing dense flows of mail.

Conversely, if, in step 27, no sorting outlet S is identified by the unit 7, the process continues in step 32 with searching for and determining the sorting outlet S from among all of the sorting outlets that has the longest idle time T as indicated in the table 14.

In step 33, if said sorting outlet that has the longest idle time has a filling level that is greater than a second threshold s2 lying in the range 45% to 55%, and set, for example, at 50%, as in this example, the process continues at step 34 with a change of tray in said sorting outlet. The tray filled with mailpieces is extracted from the sorting outlet and an empty tray is placed in said sorting outlet.

The second threshold value s2 may be adjustable so as to take account of the specificities of the flows of mail to be sorted.

In step 34, the sorting destination DL is substituted for the old sorting destination DL' to which said sorting outlet was allocated in the sort plan. The indications D and T in the table 14 are initialized.

In accordance with the invention, this logical destination DL' is identified by the unit 7 in table 13 as being a sorting destination to be amalgamated, and the next mailpieces that have that sorting destination DL' will then be processed as in steps 21 and 22 in FIG. 2.

Then, in step 35, the tray filled with mailpieces and extracted from the sorting outlet is brought by the full-tray conveyor 8, 9 to a removal outlet 10 of the sorting machine.

At the same time, in step 36, the current mailpiece is sorted into the empty tray of said sorting outlet and the indications N and T are updated in table 14 with the parameters read for the current mailpiece by the means 2B and 2C in FIG. 1.

Conversely, if, in step 33, the sorting outlet having the longest idle time has a filling level less than the second threshold s2, the process continues at step 37 with a change of tray as it does for step 34 and by a substitution of sorting destinations DL and DL' for the sorting outlet. The old sorting destination DL' is identified by the unit 7 in the table 13 as being a sorting destination to be amalgamated.

In addition, in step 38, the tray filled with mailpieces that is extracted from the sorting outlet is brought back towards the feed inlet 2 of the machine for the purpose of recycling the mailpieces that it contains.

In step 39, the current mailpiece is sorted into the empty tray of said sorting outlet and the indications N and T in table 14 are updated with the parameters read for the current mailpiece.

As indicated in FIG. 2, at the end of steps 22, 24, 26, 31, 36, and 39, the sorting process is repeated for a new current mailpiece.

At the end of the pass of the mailpieces through the machine, table 13 is erased, and the mailpieces coming from the amalgamation sorting outlet and those already brought into the storage trays of the machine are resorted in a new sorting pass into the sorting outlets of the machine.

In this new sort plan, a sorting outlet may be allocated to a plurality of sorting destinations so as to fill the storage trays in the sorting outlets as well as possible and so as to minimize the costs of transporting the trays filled with mailpieces.

It should be understood that the method of the invention may also apply to sorting outlets for which the receptacles for storing the sorted mailpieces are stackers.

In such a situation, the removal of the tray as described above from a sorting tray can be achieved in practice by unloading a separator into the sorting outlet stacker as is known to the person skilled in the art and by using an indicator light at the sorting outlet to indicate to a machine operator that the operator should transfer the contents of the stacker manually into a storage tray on which a tray label is affixed, it then being possible for the tray to be moved towards a removal outlet of the machine or indeed towards the feed inlet of the sorting machine.

It should be understood that the method of the invention may be implemented in a sorting installation that is not provided with full-tray conveyors and/or empty-tray conveyors.

The method of the invention applies to sorting mixed mail including small-format mailpieces such as letters, and large-format mailpieces such as magazines.

The method of the invention is applicable, as indicated above, to sorting a plurality of flows of mail by using a single dynamic sort plan resulting from merging the respective dynamic sort plans of the flows of mail loaded into the machine.

In the context of such an application, the flows of mail are loaded successively into the inlet of the machine, and, during the first sorting pass, the sorting outlets are not emptied of all of said mailpieces, thereby enabling better use to be made of the performance of the sorting machine.

The invention claimed is:

1. A method of sorting mailpieces according to M sorting destinations in a postal sorting machine having N sorting outlets, where M >N, the method being implemented using a data processor unit of the sorting machine according to the following steps:

- dynamically assigning the sorting outlets to the sorting destinations, with a dynamic assignment process of the data processor unit;
- if a sorting outlet of an incoming mailpiece is overbooked, substituting the overbooked sorting outlet for another sorting outlet of the postal sorting machine so as to store the incoming mailpiece in the other sorting outlet;
- identifying from among the sorting outlets first sorting outlets that have filling levels greater than a first threshold;
- identifying from among the first sorting outlets a first sorting outlet that has the longest idle time;
- assigning the first sorting outlet that has the longest idle time to the overbooked sorting outlet; and
- if all of the sorting outlets have filling levels less than the first threshold, identifying from among the sorting outlets a second sorting outlet that has the longest idle time;
- assigning the second sorting outlet to the overbooked sorting outlet; and
- indicating that the other sorting outlet is a sorting outlet to be amalgamated.

2. The method of claim 1, characterized in that, if it is determined that the incoming mailpiece to be sorted has a sorting destination indicated in the machine as being a sorting destination assigned to a sorting outlet to be amalgamated, sorting the incoming mailpiece into the sorting outlet of the machine that is assigned to amalgamation.

3. The method according to claim 1, characterized in that it further comprises the following steps:

if the second sorting outlet has a filling level greater than a second threshold, with the second threshold being less than the first threshold, removing from the sorting machine the mailpieces that are stored in the second sorting outlet; and if the second sorting outlet has a filling level less than the second threshold, recycling into an inlet of the sorting machine the mailpieces stored in the second sorting outlet.

4. The method according to claim 2, characterized in that it further comprises the following steps:

at the end of a first sorting pass of the mailpieces through the sorting machine, recycling into an inlet of the sorting machine the mailpieces that are stored in the sorting outlet assigned to amalgamation; and performing a second machine sorting pass with the recycled mailpieces for sorting the recycled mailpieces again into the sorting outlets of the sorting machine.

5. The method according to claim 1, characterized in that the first threshold lies in the range 70% to 80%.

6. The method according to claim 3, characterized in that the second threshold lies in the range 45% to 55%.

7. The method according to claim 1, characterized in that a plurality of flows of mail are loaded in succession into an inlet of the sorting machine, and a plurality of sort plans corresponding to respective ones of the plurality of flows of mailpieces are merged in the sorting machine so as to sort the mailpieces into the sorting outlets of the sorting machine by using a single sort plan.

* * * * *